United States Patent
Bansal et al.

(10) Patent No.: US 7,212,523 B2
(45) Date of Patent: May 1, 2007

(54) PIPELINE ARCHITECTURE FOR THE DESIGN OF A SINGLE-STAGE CROSS-CONNECT SYSTEM

(75) Inventors: Narendra K. Bansal, Londonderry, NH (US); Gary Martin, Boxford, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 986 days.

(21) Appl. No.: 10/401,282

(22) Filed: Mar. 27, 2003

(65) Prior Publication Data

US 2004/0190503 A1   Sep. 30, 2004

(51) Int. Cl.
*H04L 12/50*   (2006.01)
(52) U.S. Cl. .................... 370/369; 370/369; 370/375; 370/387; 370/388
(58) Field of Classification Search ............... 370/387, 370/388, 369, 375
See application file for complete search history.

(56) References Cited

U.S. PATENT DOCUMENTS

| | | | | |
|---|---|---|---|---|
| 5,982,746 A | | 11/1999 | Hanson et al. | 370/220 |
| 6,366,713 B1 | | 4/2002 | Lin et al. | 385/16 |
| 6,816,487 B1 | * | 11/2004 | Roberts et al. | 370/388 |
| 6,870,838 B2 | * | 3/2005 | Dally | 370/369 |
| 7,123,612 B2 | * | 10/2006 | Lu | 370/388 |
| 7,139,292 B1 | * | 11/2006 | Evans et al. | 370/539 |
| 7,154,887 B2 | * | 12/2006 | Wu et al. | 370/388 |
| 7,161,906 B2 | * | 1/2007 | Dell et al. | 370/231 |

OTHER PUBLICATIONS

*Creating Large Switch Fabrics using the Three-Stage* (Clos) *Architecture*; Ian Kyles, Vitesse Semiconductor Corporation, pp. 1-12.

* cited by examiner

*Primary Examiner*—Doris H. To
*Assistant Examiner*—Thien D. Tran
(74) *Attorney, Agent, or Firm*—Weingarten, Schurgin, Gagnebin & Lebovici LLP (57) ABSTRACT

An architecture for a high bandwidth digital cross-connect switching system that is internally non-blocking, has a simpler layout, and employs a reduced number of logic gates. The high bandwidth digital cross-connect switching architecture comprises a Time Division Multiplexing (TDM) cross-connect including M space/time switches. Each space/time switch includes an input bus, an output bus, N×W Flip-Flops (FFs) for storing input data, W N-by-N switches for sorting the data according to predetermined cross-connection requirements, and N×W FFs for storing output data, in which "N" corresponds to the number of input ports and the number of output ports in the N-by-N switch, and "W" corresponds to the width of each data word. Each N-by-N switch includes N×W N-to-1 selectors, and the M space/time switches include N×W M-to-1 selectors, thereby allowing an effective N×M-to-1 selection to be performed on the data words.

7 Claims, 5 Drawing Sheets

PIPELINE ARCHITECTURE FOR THE DESIGN OF A SINGLE-STAGE CROSS-CONNECT SYSTEM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to digital communications systems, and more specifically to an architecture of a high bandwidth single-stage digital cross-connect switching system.

Digital communications systems are known that employ digital cross-connect switching systems for cross-connection of high speed optical or electrical signals in broadband communications networks. Conventional digital cross-connect switching systems typically have either a single-stage or multi-stage switching architecture. For example, a conventional single-stage cross-connect switching architecture may comprise at least one multi-port Random Access Memory (RAM) such as a Single Write Many Read (SWMR) multi-port RAM or a Many Write Single Read (MWSR) multi-port RAM. The SWMR or MWSR multi-port RAM typically includes a first plurality of Flip-Flops (FFs) for storing input data, a plurality of selectors for sorting the data according to a predetermined switching configuration, and a second plurality of FFs for storing output data. Further, whereas the SWMR multi-port RAM is typically configured to write the input data into storage as it arrives, and read the sorted output data according to the predetermined switching configuration, the MWSR multi-port RAM typically sorts the input data as it arrives, writes the sorted data into storage, and then sequentially reads the sorted output data.

One drawback of the conventional single-stage cross-connect switching architecture including the SWMR or MWSR multi-port RAM is that as the number of ports increases, the number of combinatorial logic gates required for sorting the data also increases. Further, as the number of combinatorial logic gates increases the number and lengths of lines required to interconnect the logic gates typically increase, thereby expanding the area required to layout the selectors. This can be problematic when implementing the SWMR or MWSR multi-port RAM on an Application Specific Integrated Circuit (ASIC) because the expanded layout area can increase the die size requirements, which in turn can lead to higher manufacturing costs.

The conventional multi-stage cross-connect switching architecture may comprise a three-stage Clos architecture, in which the cross-connect switching system includes a first group of switches in an input stage, a second group of switches in a center stage, and a third group of switches in an output stage. For example, a three-stage Clos architecture configured to interconnect N input ports and N output ports may include N/n n-by-k switches in the input stage, k N/n-by-N/n switches in the center stage, and N/n k-by-n switches in the output stage. Further, for most cross-connection requirements, the three-stage Clos architecture is non-blocking, i.e., any input port can connect to any output port without preventing any other input port from connecting to any other output port.

However, the conventional three-stage Clos architecture also has drawbacks in that the architecture can block when required to make some advanced multicast connections. For example, overlapping multicast connections in the three-stage Clos cross-connect system can sometimes leave stranded bandwidth in different parts of the network, which may prevent a desired cross-connection between selected input and output ports. It can also be difficult to assure that the three-stage Clos cross-connect system remains non-blocking when implementing certain protection switching schemes.

It would therefore be desirable to have an architecture of a high bandwidth digital cross-connect switching system that has a simpler and more compact layout. Such a cross-connect architecture would employ a switch fabric that is internally non-blocking. It would also be desirable to have a cross-connect architecture that can be implemented on one or more ASICs with a reduced number of logic gates.

BRIEF SUMMARY OF THE INVENTION

In accordance with the present invention, an architecture of a high bandwidth digital cross-connect switching system is provided that is internally non-blocking, has a simpler layout, and employs a reduced number of logic gates. Benefits of the presently disclosed high bandwidth digital cross-connect switching architecture are achieved by providing a single-stage Time Division Multiplexing (TDM) cross-connect switching system that includes a plurality of switches arranged to perform a number of pipelined switching operations.

In one embodiment, the high bandwidth digital cross-connect switching architecture comprises a TDM cross-connect including M space/time switches, each space/time switch operating on data corresponding to a respective one of M time slots. Each space/time switch includes an input bus, an output bus, N×W Flip-Flops (FFs) for storing input data, W N-by-N switches for sorting the data according to predetermined cross-connection requirements, and N×W FFs for storing output data, in which "N" corresponds to the number of input ports and the number of output ports in the N-by-N switch, and "W" corresponds to the width (in bits) of each data word.

In a first clock cycle, the TDM cross-connect switching system is operative to receive a first set of N words of data corresponding to a first one of the M time slots from the input bus, and store the first set of N data words in the N×W input FFs of the first space/time switch. In a second clock cycle, the TDM cross-connect switching system stores the first set of N data words in the N×W input FFs of the second space/time switch, receives a second set of N data words corresponding to a second one of the M time slots from the input bus, and stores the second set of N data words in the N×W input FFs of the first space/time switch. In a third through $M^{th}$ clock cycles, the process continues for M sets of N data words, which propagate through the respective N×W input FFs of the M space/time switches until the $M^{th}$ set of N data words is stored in the N×W input FFs of the first space/time switch, and the first set of N data words is stored in the N×W input FFs of the $M^{th}$ space/time switch. Each space/time switch performs switching operations on each successive set of N data words. Specifically, each set of N data words is passed through N×W N-to-1 selectors included in the corresponding W N-by-N switches of the respective M space/time switches. The resulting sets of N data words at outputs of the N×W N-to-1 selectors are then stored in the corresponding N×W output FFs of the respective space/time switches. Next, the sets of N data words are pipelined through N×W M-to-1 selectors included in the corresponding W N-by-N switches of the respective space/time switches. It is noted that although each space/time switch performs data selections for all of its N outputs, the N outputs are provided for use by the overall switching system only once every M clock cycles. As a result, the first space/time switch provides N outputs corresponding to the first time slot, the second space/time switch provides N outputs corresponding to the second time slot, and so on until the $M^{th}$ space/time switch provides N outputs corresponding to the $M^{th}$ time slot. The resulting M sets of N data words at the outputs of the N×W M-to-1 selectors are then passed through an OR gate for subsequent placement on the output bus.

By first passing the M sets of N data words, each set of data words corresponding to a respective time slot, through the N×W N-to-1 selectors to perform a "space selection" on the data, and then passing the M sets of N data words through the N×W M-to-1 selectors to perform a "time selection" on the data, an effective N×M-to-1 selection can be performed on data frames in a single-stage TDM cross-connect switching system that is non-blocking, is easier to layout, and includes a reduced number of logic gates.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

A high bandwidth digital cross-connect switching system is disclosed that is internally non-blocking, is easier to layout, and includes a reduced number of logic gates. The presently disclosed digital cross-connect switching system achieves such benefits via a single-stage Time Division Multiplexing (TDM) cross-connect switching architecture including M pipelined space/time switches, in which each space/time switch provides data outputs for a respective one of M time slots.

Figure 1:
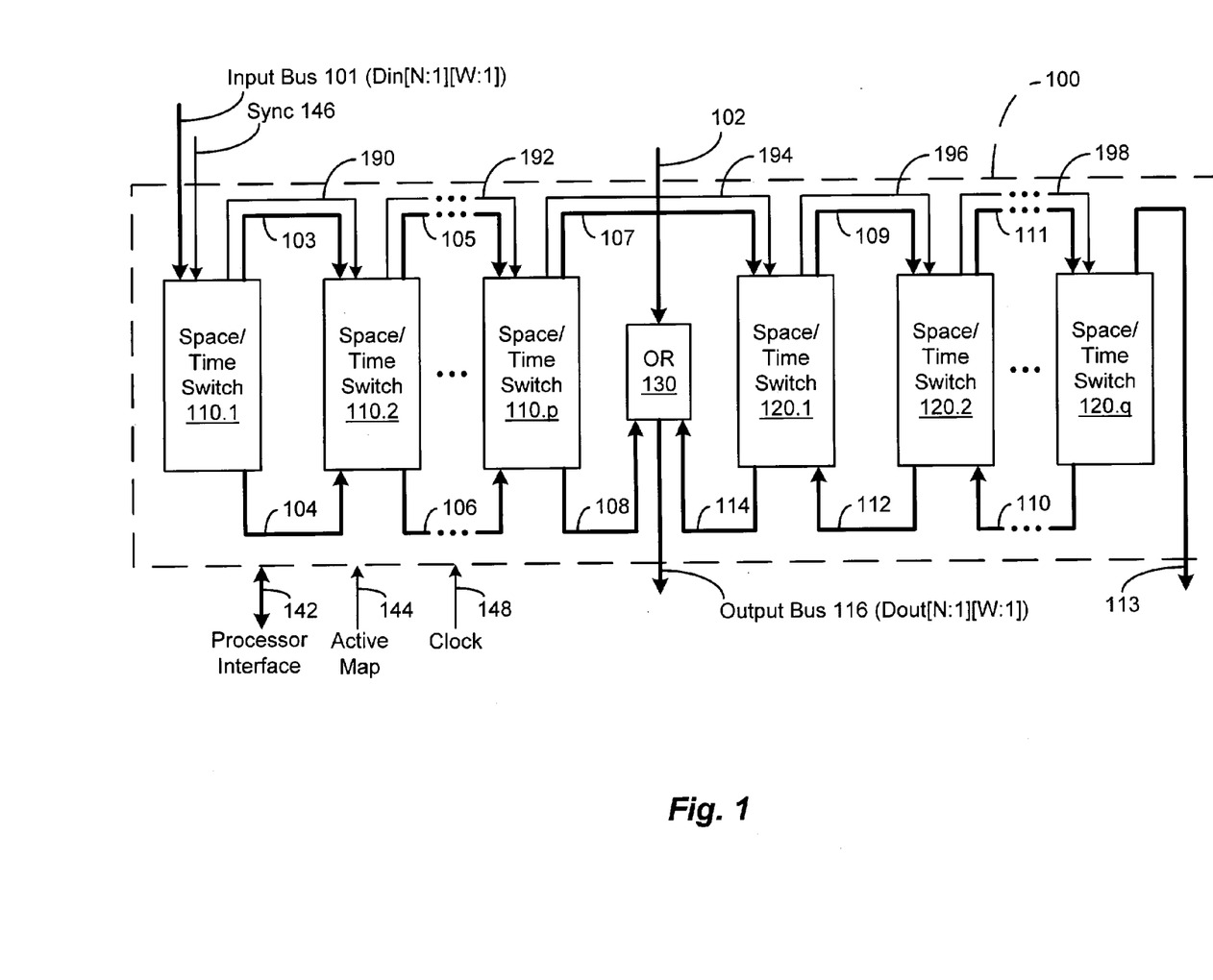
FIG. 1 is a block diagram of an architecture of a high bandwidth single-stage digital cross-connect switching system according to the present invention.

FIG. 1 depicts an illustrative embodiment of an architecture of a single-stage TDM cross-connect switching system 100, in accordance with the present invention. In the illustrated embodiment, the cross-connect switching system 100 includes an input bus 101, a plurality of space/time switches 110.1–110.p and 120.1–120.q, an OR gate 130, and an output bus 116. The cross-connect switching system 100 is configured for processing and cross-connecting high speed optical and/or electrical signals, e.g., OC-3, OC-12, STS-1, STS-3, STS-Nc, STS-M, and/or STM-1 data frames, in a broadband digital communications network such as a Local Area Network (LAN), a Wide Area Network (WAN), the Internet, or any other suitable network.

For purposes of illustration, the data frames processed by the cross-connect switching system 100 are represented herein by M sets of N words of data, in which "M" is equal to the number of space/time switches included in the cross-connect switching system (p+q=M), and "N" corresponds to the number of input/output ports in the cross-connect switching system. Each set of N data words corresponds to a respective one of M time slots. Further, each of the N data words processed by the respective space/time switches has a width equal to W (in bits).

In a first clock cycle, the space/time switch 110.1 (see FIG. 1) is configured to receive a first set of N data words, i.e., Din[N:1] [W:1], from the input bus 101, and to store the N data words in a plurality of input storage units included therein. In a second clock cycle, the space/time switch 110.1 receives and stores a second set of N data words from the input bus 101, while the first set of N data words are conveyed over a bus 103 to the space/time switch 110.2 for subsequent storage therein. In a third through $M^{th}$ clock cycles, the process continues for M sets of N data words, which propagate through the respective pluralities of input storage units of the space/time switches 110.1–110.p and 120.1–120.q over buses 105, 107, 109, and 111 until the $M^{th}$ set of N data words is stored in the input storage units of the space/time switch 110.1, and the first set of N data words is stored in the input storage units of the space/time switch 120.q.

In the presently disclosed embodiment, each one of the space/time switches 110.1–110.p and 120.1–120.q performs switching operations on each successive set of N data words. Specifically, the M sets of N data words effectively undergo an N×M-to-1 selection in each of the space/time switches 110.1–110.p and 120.1–120.q, thereby selecting one data word out of the M sets of N data words. It should be understood that although each one of the space/time switches 110.1–110.p and 120.1–120.q performs data selections on each set of N data words, selected data is provided over respective buses 104, 106, 108, 110, 112, and 114 only once every M clock cycles. In effect, the space/time switch 110.1 provides N data outputs for the first one of the M time slots, the space/time switch 110.2 provides N data outputs for the second one of the M time slots, the space/time switch 110.p provides N data outputs for the $p^{th}$ one of the M time slots, and so on until the space/time switch 120.q provides N data outputs for the $M^{th}$ one of the M time slots. The data selected by the M space/time switches is then provided to the OR gate 130 via the buses 104, 106, 108, 110, 112, and 114. Next, the OR gate 130 provides the selected data, i.e., Dout[N:1] [W:1], to the output bus 116. In this way, any one of the N input ports can be made to connect to any one or more of the N output ports of the cross-connect switching system 100.

The cross-connect switching system 100 is configured to operate under the control of at least one processor (not shown) via a processor interface bus 142, respective control lines 144 and 146 carrying "Active Map" and Frame Sync ("Sync") control signals, and at least one clock line 148 carrying at least one clock signal. It is noted that the Active Map control line 144 may be part of the processor interface bus 142, however the Sync control line 146 is typically implemented separate from the processor. Further, the numbers p and q of space/time switches included in the cross-connect switching system 100 may be selected to suit the cross-connection requirements of the network. In a preferred embodiment, the number "p" is equal to the number "q". It is also noted that in the event p and q are restricted to specific values, a plurality of the cross-connect switching systems 100 may be interconnected to increase the number of "M" sets of N data words handled by the overall system, thereby increasing the total data handling capacity of the system. To that end, N data words from the space/time switch 120.q carried by a bus 113 are re-timed and provided to the input bus 101 of an adjacent cross-connect switching system, and N data words from the OR gate 130 carried by the output bus 116 are provided to the bus 102 of the adjacent cross-connect switching system, and so on until a desired number of cross-connect switching systems is interconnected.

Figure 4:
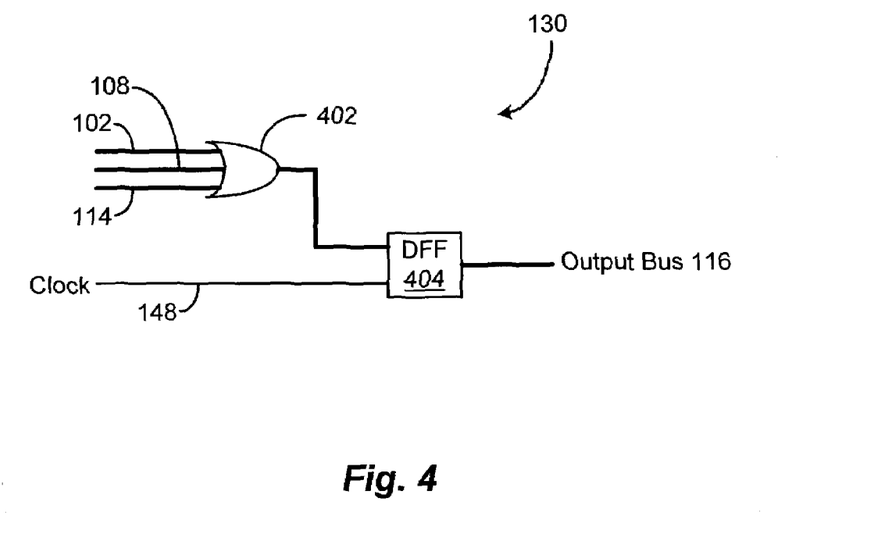
FIG. 4 is a block diagram of an OR gate/re-timer included in the cross-connect switching system of FIG. 1.

FIG. 4 depicts an illustrative embodiment of the OR gate 130 included in the cross-connect switching system 100 (see FIG. 1). In the illustrated embodiment, the buses 102, 108, and 114 provide the selected N data words to an OR gate 402, which in turn provides the OR'd data to a D-Flip-Flop (DFF) 404 clocked by the clock signal on the line 148. In this way, the selected N data words are appropriately re-timed before being placed on the output bus 116.

Figure 2:
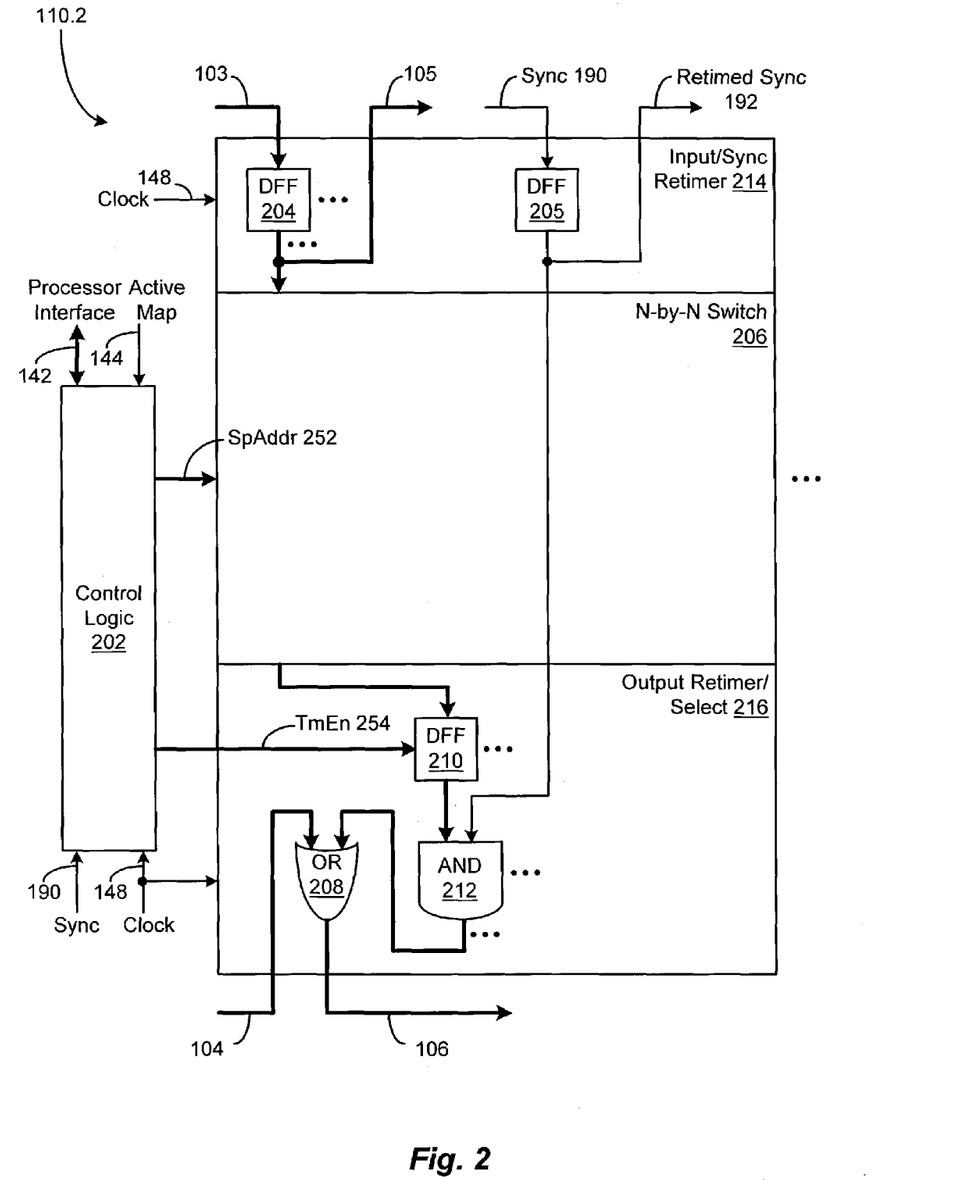
FIG. 2 is a block diagram of a space/time switch included in the cross-connect switching system of FIG. 1.

FIG. 2 depicts an illustrative embodiment of the space/time switch 110.2 included in the high bandwidth digital cross-connect switching system 100 (see FIG. 1). It should be understood that each of the space/time switches 110.1, 110.3–110.p, and 120.1–120.q is like the space/time switch 110.2, as depicted in FIG. 2. In the illustrated embodiment, the space/time switch 110.2 includes control logic 202, an input/sync re-timer 214, an N-by-N switch 206, and an output re-timer/selector 216. Specifically, the input/sync re-timer 214 is configured to receive N data words over the bus 103 from the space/time switch 110.1 during each cycle of the clock on the line 148, and to store the N data words in a plurality of input storage units such as D-Flip-Flops (DFFs) 204. Because each of the N data words is W-bits wide, the DFFs 204 include N×W DFFs. The input/sync re-timer 214 also receives the Sync control signal over a line 190, and stores the Sync control signal in a storage unit such as a DFF 205. In this way, the Sync control signal is appropriately re-timed before being conveyed to the successive space/time switches 110.3–110.p and 120.1–120.q via lines 192, 194, 196, and 198.

As shown in FIG. 2, the N×W DFFs included in the input re-timer 214 provide the set of N data words to the N-by-N switch 206, which is configured to perform an N-to-1 selection on the respective data words. Because each of the N data words is W-bits wide, the N-by-N switch 206 includes W N-to-1 selectors.

Figure 5:
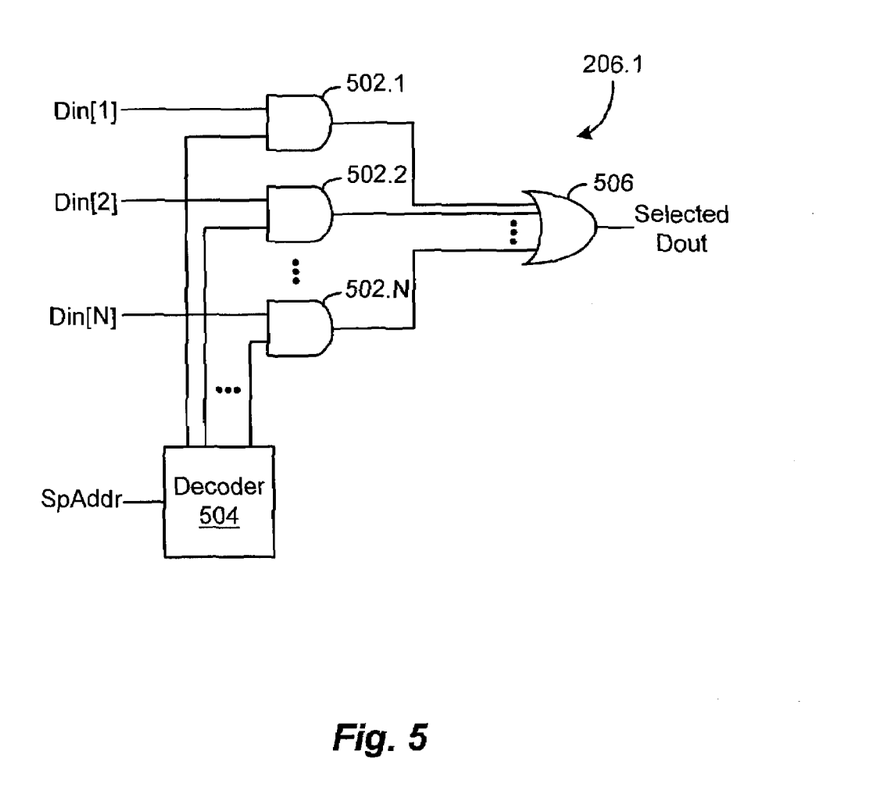
FIG. 5 is a block diagram of an N-to-1 selector included in the space/time switch of FIG. 2.

FIG. 5 depicts an illustrative embodiment of an N-to-1 selector 206.1 included in the N-by-N switch 206 (see FIG. 2). In the illustrated embodiment, the N-to-1 selector 206.1 (see FIG. 5) includes N AND gates 502.1–502.N, and an OR gate 506. The AND gates 502.1–502.N are configured to receive corresponding bits Din[1]-Din[N] of the N data words provided by the N×W DFFs of the input re-timer 214, and respective select signals provided by a decoder 504. The select signals correspond to a space address select signal ("SpAddr") provided to the respective decoder 504 by the control logic 202. The SpAddr signal is operative to cause the decoder 504 to select a single one of the AND gates 502.1–502.N in each clock cycle corresponding to a specific Active Map control signal on the line 144. The AND gates 502.1–502.N provide their respective outputs to the OR gate 506, which in turn generates the single Dout bit selected out of the Din[1]-Din[N] bits.

It is noted that the N-to-1 selector 206.1 may be assigned an "activity factor", which corresponds to the number of AND gates 502.1–502.N selected during each clock cycle. The activity factor is approximately proportional to the amount of power consumed by the N-to-1 selector 206.1. In the presently disclosed embodiment, because only one of the AND gates 502.1–502.N is selected in each clock cycle, the N-to-1 selector 206.1 has an activity factor of 1/N, which indicates that the power consumed by the N-to-1 selector 206.1 is relatively low.

As shown in FIG. 2, the N-by-N switch 206 provides the N data words selected by the N×W N-to-1 selectors (e.g., the N-to-1 selector 206.1; see FIG. 5) to a plurality of output storage units such as DFFs 210 included in the output re-timer/selector 216. Because each of the N data words is W-bits wide, the DFFs 210 include N×W DFFs.

As described above, each one of the space/time switches 110.1–110.p and 120.1–120.q (see FIG. 1) performs switching operations on each successive set of N data words. To that end, the N-by-N switch 206 performs the N-to-1 selection (called herein a "space selection") on the respective data words, and the respective output re-timer/selectors (e.g., the output re-timer/selector 216) included in the space/time switches 110.1–110.p and 120.1–120.q (see FIG. 1) are configured to perform an M-to-1 selection (called herein a "time selection") on the respective data words, thereby resulting in an effective N×M-to-1 selection on the M sets of N data words.

Specifically, when enabled by Time Enable ("TmEn") signals provided by the control logic 202 on a bus 254, each of the N×W DFFs included in the output re-timer/selector 216 (such as the DFFs 210; see FIG. 2) provides a selected Dout bit to a respective AND gate (such as an AND gate 212; see FIG. 2). It is noted that the TmEn signals enable the N×W DFFs to capture data words corresponding to a single time slot. The AND gate 212 is selected by the Sync control signal from the DFF 205. Because the corresponding N×W DFFs (such as the DFFs 210) included in the output re-timer/selectors of the respective space/time switches 110.1–110.p and 120.1–120.q are enabled during a respective one of the M time slots, the output re-timer/selectors perform the required M-to-1 selection on the M sets of data words. Next, the AND gate 212 provides the selected set of data words to an OR gate 208, which also receives a selected set of data words from the output re-timer/selector of the space/time switch 110.1 (see FIG. 1) over the bus 104. The OR gate 208 (see FIG. 2) then provides the selected sets of data words to the output re-timer/selector of the space/time switch 110.3 over the bus 106.

Figure 3:
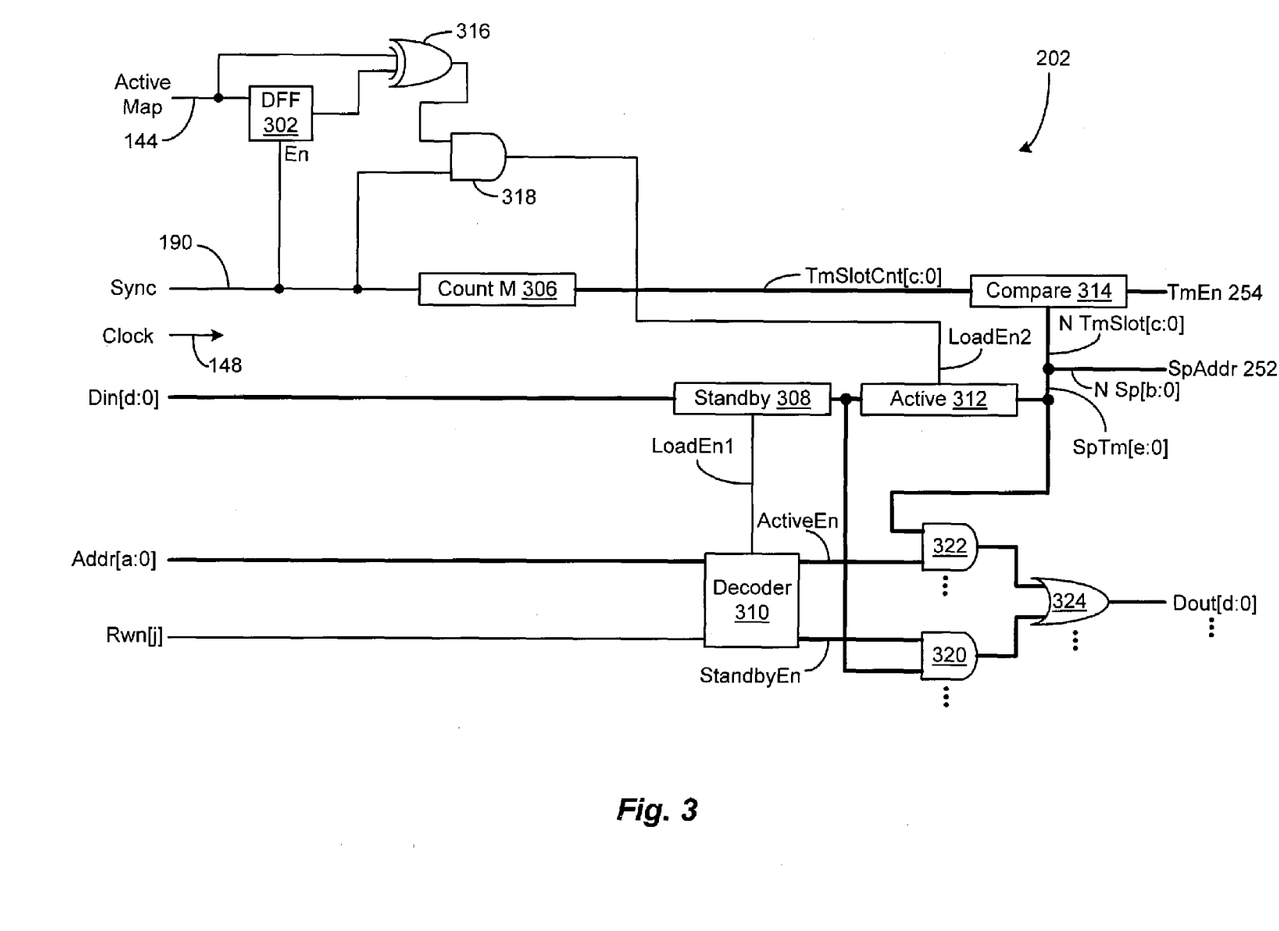
FIG. 3 is a block diagram of control logic included in the space/time switch of FIG. 2.

FIG. 3 depicts an illustrative embodiment of the control logic 202 included in the space/time switch 110.2 (see FIG. 2). As shown in FIG. 3, the Active Map control signal on the line 144 is provided to a DFF 302, which is enabled by the Sync control signal. The Active Map control signal and the output of the DFF 302 are provided to an Exclusive-Or (XOR) gate 316, which in turn provides its output to an AND gate 318. Further, the Sync control signal is provided to the AND gate 318, and to a counter 306 as a reset signal.

In the preferred embodiment, the processor is operative to generate a Din[d:0] data signal, an Addr[a:0] address signal, and a Rwn[j] control signal. The Din[d:0] signal comprises data for generating the SpAddr select signal on the bus 252, and the TmEn enable signal on the bus 254. Specifically, the Din[d:0] data is provided to a Standby data register 308, and the Addr[a:0] and Rwn[j] signals are provided to a decoder 310 for generating a Load Enable ("LoadEn1") signal for the Standby register 308. When the LoadEn1 signal is asserted, the Din[d:0] data is written into the Standby register 308. It is noted that multiple data writes to the Standby register 308 over the Din[d:0] bus are required to fill the register. The AND gate 318 generates a Load Enable ("LoadEn2") signal for an Active data register 312. When a change is detected in the Active Map control signal, the AND gate 318 asserts the LoadEn2 signal on the next Sync boundary, thereby transferring the data stored in the Standby register 308 to the Active register 312.

It is noted that the Standby register 308 provides the "standby" data to one of a plurality of AND gates 320, and the Active register 312 provides the "active" data to one of a plurality of AND gates 322. The respective numbers of AND gates 320 and 322 are dependent upon the address mapping of the space/time control information in the Standby and Active registers 308 and 312, respectively. Further, the decoder 310 provides Active Enable ("ActiveEn") and Standby Enable ("StandbyEn") signals to the respective AND gates 322 and 320 for selectively generating corresponding "active" and "standby" data signals via one of d+1 OR gates 324.

The active data signal provided by the Active register 312 comprises a Space/Time ("SpTm") [e:0] signal, which includes a sufficient number of bits for generating N Space ("Sp") [b:0] signals and N Time Slot ("TmSlot") [c:0] signals. The N Sp [b:0] signals are provided on the bus 252 as the SpAddr select signal, and the N TmSlot [c:0] signals are used to form the TmEn enable signal on the bus 254. Specifically, the counter 306 is configured for counting from 0 to M−1, thereby generating a Time Slot Count ("TmSlotCnt") [c:0]. Further, a Comparator ("Compare") 314 receives the TmSlotCnt[c:0] signal and the TmSlot[c:0] signals. In the event the TmSlotCnt[c:0] signal and the respective TmSlot[c:0] signals match, the Compare circuit 314 provides the TmEn signal on the bus 254. It is noted that a single time slot count (TmSlotCnt) is fanned out to N comparator (Compare) circuits, which compare the N different time slot (TmSlot) values. In this way, the SpAddr and TmEn signals are generated for subsequently performing the required space and time selections on the M sets of N data words, in accordance with predetermined cross-connection requirements of the network.

The high bandwidth digital cross-connect switching system 100 will be better understood with reference to the following illustrative example. In this example, the cross-connect switching system has 136 input/output ports (i.e., N=136), and is capable of processing 48 sets (i.e., M=48) of 136 data words, in which each data word is 8-bits wide (i.e., W=8). Accordingly, the cross-connect switching system 100 includes three space/time switches 110.1–110.3 and three space/time switches 120.1–120.3 (i.e., p=q=3), and eight (8) such cross-connect switching systems are interconnected via the respective input and output buses to provide a total of 48 space/time switches for processing the 48 sets of 136 data words.

It is noted that each of the 48 space/time switches in this example comprises 136×8 input DFFs in the input re-timer, a 136-by-136 switch including 136×8 136-to-1 selectors for performing the space selection on the data words, and 136×8 output DFFs, 136×8 AND gates, and 136×8 OR gates in the output re-timer/selector configured as 136×8 48-to-1 selectors for performing the time selection on the data words. Further, the input buses are configured to convey 48 sets of 136 data words, i.e., Din[136:1] [8:1], and the output buses are configured to convey 48 sets of 136 data words, i.e., Dout[136:1] [8:1], between the 48 space/time switches. The resulting cross-connect switching system requires less connectivity and less circuitry than conventional cross-connect switching systems.

Figure 6:
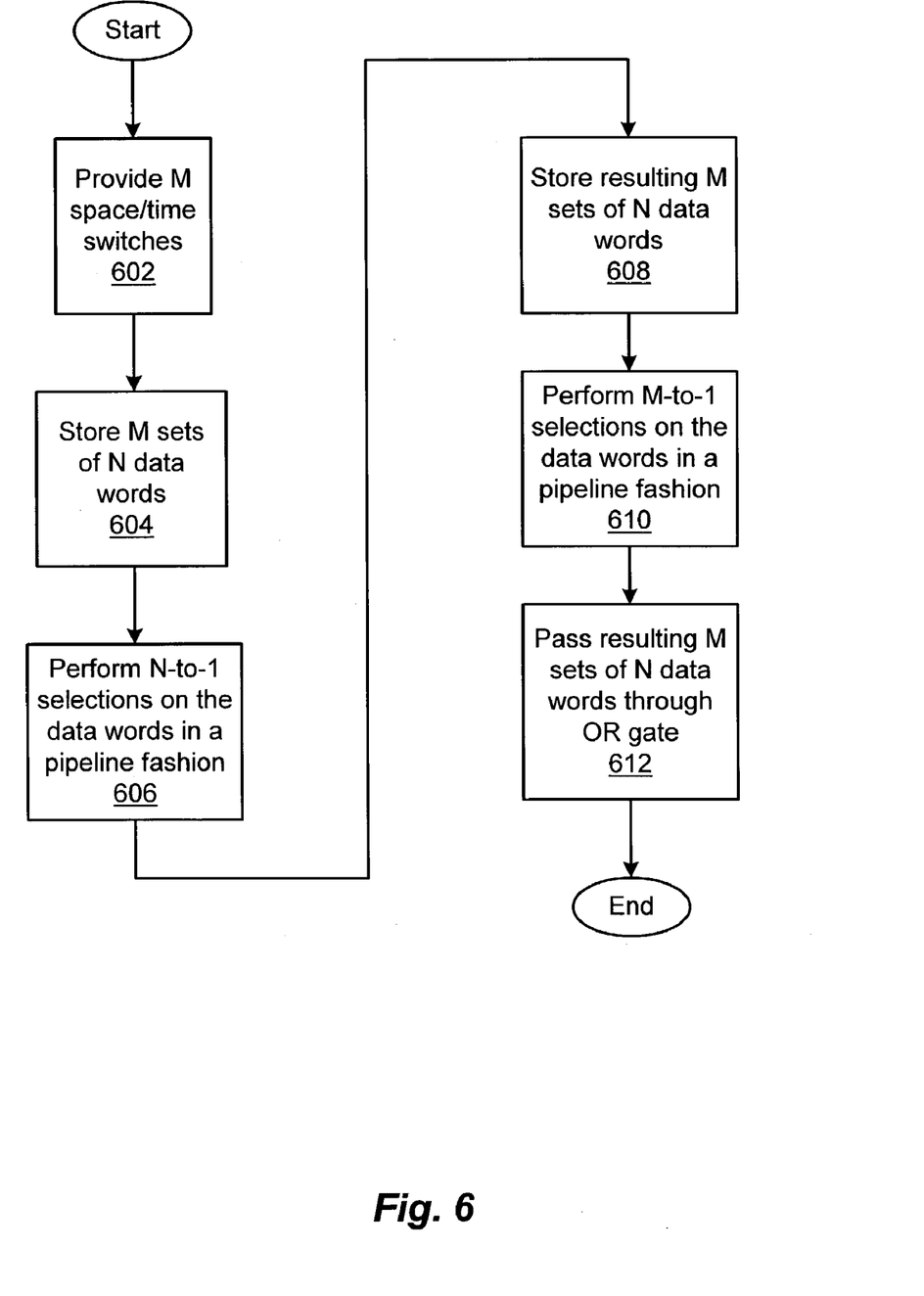
FIG. 6 is a flow diagram illustrating a method of operation of the cross-connect switching system of FIG. 1.

A method of operating the high bandwidth digital cross-connect switching system is illustrated by reference to FIG. 6. As depicted in step 602, M space/time switches are provided for processing M sets of N data words. Next, in M clock cycles, M sets of N data words are successively stored, as depicted in step 604, in respective input storage units of the space/time switches. Further, the M sets of N data words undergo in a pipeline fashion, as depicted in step 606, respective N-to-1 selections in the space/time switches according to predetermined cross-connection requirements of the network. In the next M clock cycles, the resulting M sets of N data words are stored, as depicted in step 608, in respective output storage units of the space/time switches. Further, the M sets of N data words undergo in a pipeline fashion, as depicted in step 610, respective M-to-1 selections in the space/time switches according to the predetermined cross-connection requirements. Next, the resulting M sets of N data words at the outputs of the M-to-1 selectors are passed, as depicted in step 612, through an OR gate for subsequent transmission through the network.

It will further be appreciated by those of ordinary skill in the art that modifications to and variations of the above-described pipeline architecture for the design of a single-stage cross-connect system may be made without departing from the inventive concepts disclosed herein. Accordingly, the invention should not be viewed as limited except as by the scope and spirit of the appended claims.

What is claimed is:

1. An architecture for a Time Division Multiplexing (TDM) cross-connect switching system, comprising:
   an input bus;
   an output bus;
   at least one OR gate; and
   a pipeline structure having a plurality of M pipeline stages, each stage comprising a respective TDM cross-connect switch, the pipeline structure being communicably coupled between the input bus and the OR gate, the OR gate being communicably coupled between the pipeline structure and the output bus,
   wherein each of the pipelined M TDM cross-connect switches is operative to successively receive M sets of N groups of data, and to perform N-to-1 selections on the respective M sets of N data groups to generate corresponding sets of N groups of switched data, each TDM cross-connect switch being further operative to perform M-to-1 selections on the respective M sets of N switched data groups, thereby effectively performing N×M-to-1 selections on the M sets of N data groups, and
   wherein the OR gate is operative to receive the M sets of N switched data groups from the M TDM cross-connect switches, to perform a logical OR operation on the switched data groups, and to provide the logical OR'd data to the output bus.

2. The architecture of claim 1 wherein each of the M TDM cross-connect switches includes a first plurality of N×W storage elements operative to store the respective sets of N data groups, a plurality of W N-by-N switches operative to perform the N-to-1 selections on the respective sets of N data groups, each N-by-N switch including N input ports and N output ports, and a second plurality of N×W storage elements operative to store the respective M sets of N switched data groups, wherein W is a value equal to a width of each data group.

3. The architecture of claim 2 wherein each N-by-N switch includes a plurality of N×W N-to-1 selectors operative to perform the N-to-1 selections on the respective N data groups.

4. A method of operating a Time Division Multiplexing (TDM) cross-connect switching system, comprising the steps of:
  successively receiving a plurality of M sets of N groups of data from an input bus by a plurality of M TDM cross-connect switches, each TDM cross-connect switch comprising a respective stage of a pipeline structure;
  performing N-to-1 selections on the respective M sets of N data groups by each TDM cross-connect switch, thereby generating M sets of N groups of first switched data;
  performing M-to-1 selections on the respective M sets of N first switched data groups by each TDM cross-connect switch, thereby generating M sets of N groups of second switched data to effectively perform N×M-to-1 selections on the M sets of N data groups;
  receiving the M sets of N second switched data groups from the M TDM cross-connect switches by an OR gate;
  performing a logical OR operation on the M sets of N second switched data groups to generate logical OR'd data by the OR gate; and
  providing the logical OR'd data to the output bus by the OR gate.

5. The method of claim 4 further including the steps of storing the respective sets of N data groups by a first plurality of N×W storage elements included in the M TDM cross-connect switches, and storing the respective M sets of N first switched data groups by a second plurality of N×W storage elements included in the M TDM cross-connect switches, wherein W is a value equal to a width of each data group.

6. The method of claim 4 wherein the first performing step includes performing the N-to-1 selections on the respective data groups by a plurality of W N-by-N switches included in the M TDM cross-connect switches, wherein W is a value equal to a width of each data group.

7. The method of claim 6 wherein the first performing step includes performing the N-to-1 selections on the respective data groups by a plurality of N×W N-to-1 selectors included in the plurality of W N-by-N switches.

* * * * *